United States Patent
Fuentes (10) Patent No.: US 10,773,289 B2
(45) Date of Patent: Sep. 15, 2020

(54) AUTO BODY REPAIR ASSEMBLY

(71) Applicant: Adan Fuentes, Hawthorne, CA (US)

(72) Inventor: Adan Fuentes, Hawthorne, CA (US)

( * ) Notice: Subject to any disclaimer, the term of this patent is extended or adjusted under 35 U.S.C. 154(b) by 247 days.

(21) Appl. No.: 15/925,842

(22) Filed: Mar. 20, 2018

(65) Prior Publication Data

US 2019/0291157 A1 Sep. 26, 2019

(51) Int. Cl.
*B21D 1/10* (2006.01)
*B21D 1/12* (2006.01)
*B23B 45/00* (2006.01)
*B21D 1/06* (2006.01)

(52) U.S. Cl.
CPC .............. *B21D 1/12* (2013.01); *B21D 1/06* (2013.01); *B21D 1/10* (2013.01); *B23B 45/003* (2013.01); *Y10S 72/705* (2013.01)

(58) Field of Classification Search
CPC .... B21D 1/10; B21D 1/06; B21D 1/08; Y10T 403/459
USPC ...................... 403/109.3, 345; 81/22; 72/705
See application file for complete search history.

(56) References Cited

U.S. PATENT DOCUMENTS

| | | | | |
|---|---|---|---|---|
| 4,072,042 A | * | 2/1978 | Servin | B21D 1/06 72/457 |
| 4,412,158 A | * | 10/1983 | Jefferson | H02P 25/145 318/257 |
| 4,624,323 A | * | 11/1986 | Burrola | B25B 15/001 173/128 |
| 4,737,048 A | * | 4/1988 | Herrstrom | E01F 9/627 40/608 |
| 5,329,802 A | * | 7/1994 | Nunez | B21D 1/06 72/457 |
| 5,408,861 A | * | 4/1995 | McCain | B21D 1/06 72/457 |
| 5,727,418 A | * | 3/1998 | Strozier | B21D 1/06 72/457 |
| 6,539,770 B2 | | 4/2003 | Olsson | |
| 6,612,144 B2 | | 9/2003 | Domino | |
| 6,739,173 B2 | | 5/2004 | Lowery | |

(Continued)

FOREIGN PATENT DOCUMENTS

WO    WO-2010134431 A1 * 11/2010 ............. B25F 5/001

OTHER PUBLICATIONS

Ohio Electric Motors Inc., "What is the difference between an AC motor and a DC motor?", Dec. 4, 2015, Ohio Electric Motors Inc. (Year: 2015).*

(Continued)

*Primary Examiner* — Adam J Eiseman
*Assistant Examiner* — Dylan Schommer (57) ABSTRACT

An auto body repair assembly for removing dents includes a rotary tool that has a shaft. An extender is operationally couplable to the shaft. A first cylinder, which is weighted, is positioned to insert the extender to slidably couple the first cylinder to the extender. A bit is operationally couplable to the extender distal from the rotary tool. The bit has a first section that is configured to penetrate sheet metal and a second section that is threaded and configured to couple to the sheet metal. The rotary tool is positioned to rotate the bit to penetrate the sheet metal and to couple the bit to the sheet metal. The first cylinder is configured to be grasped in a hand of a user to propel the first cylinder along the extender to the rotary tool to apply force to a dent in the sheet metal.

18 Claims, 9 Drawing Sheets

(56) References Cited

U.S. PATENT DOCUMENTS

| | | | | |
|---|---|---|---|---|
| 7,036,211 | B1* | 5/2006 | Panks | B25B 27/02 173/29 |
| 7,430,891 | B1* | 10/2008 | Wang | B21D 1/06 72/457 |
| 8,418,522 | B1* | 4/2013 | Liao | B21D 1/06 72/453.01 |
| 8,938,900 | B1* | 1/2015 | Halle | A45F 3/44 248/508 |
| 9,908,161 | B1* | 3/2018 | Gamble | B21D 1/06 |
| 10,421,132 | B1* | 9/2019 | Riffell | B23B 51/126 |
| 2002/0078731 | A1* | 6/2002 | Peters | B21D 1/06 72/457 |
| 2004/0144553 | A1* | 7/2004 | Ashbaugh | B25F 5/00 173/169 |
| 2005/0188742 | A1* | 9/2005 | Snowden | B21D 1/10 72/457 |
| 2013/0037766 | A1* | 2/2013 | Liao | F04B 37/14 254/133 R |
| 2016/0158819 | A1 | 6/2016 | Johnson | |

OTHER PUBLICATIONS

Carbide and Diamond Tooling, "Annular Cutter Extension Arbors 3/4"×2", 3", 4", 6" Long for Mag Drill Units", Feb. 4, 2015, Carbide and Diamond Tooling (Year: 2015).*

* cited by examiner

AUTO BODY REPAIR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to repair assemblies and more particularly pertains to a new repair assembly for removing dents.

BRIEF SUMMARY OF THE INVENTION

An embodiment of the disclosure meets the needs presented above by generally comprising a rotary tool that has a shaft. An extender is operationally couplable to the shaft. A first cylinder, which is weighted, is positioned to insert the extender to slidably couple the first cylinder to the extender. A bit is operationally couplable to the extender distal from the rotary tool. The bit has a first section that is configured to penetrate sheet metal and a second section that is threaded and configured to couple to the sheet metal. The rotary tool is positioned to rotate the bit to penetrate the sheet metal and to couple the bit to the sheet metal. The first cylinder is configured to be grasped in a hand of a user to propel the first cylinder along the extender to the rotary tool to apply force to a dent in the sheet metal.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 10 thereof, a new repair assembly embodying the principles and concepts of an embodiment of the disclosure and generally designated by the reference numeral 10 will be described.

As best illustrated in FIGS. 1 through 10, the auto body repair assembly 10 generally comprises a rotary tool 12 that is selectively reversible. The rotary tool 12 comprises a housing 14 that defines an internal space 16. A motor 18 is coupled to the housing 14 and is positioned in the internal space 16. A shaft 20 is coupled to the motor 18 and extends from a front 22 of the housing 14. A power module 24 is coupled to the housing 14 and is positioned in the internal space 16. The power module 24 is operationally coupled to the motor 18. The power module 24 is configured to couple the motor 18 to a source of alternating current, a compressed air supply, or the like.

A controller 26 is coupled to the housing 14. The controller 26 is operationally coupled to the motor 18. The controller 26 is configured to selectively control a rotational speed of the shaft 20 and a direction of rotation of the shaft 20. The controller 26 comprises a toggle switch 28 and a slide switch 30. The toggle switch 28 is positioned to toggle between a high rotational speed and a low rotational speed of the shaft 20. The slide switch 30 is positioned to select a forward direction of rotation and reverse direction of rotation for the shaft 20.

Figure 5:
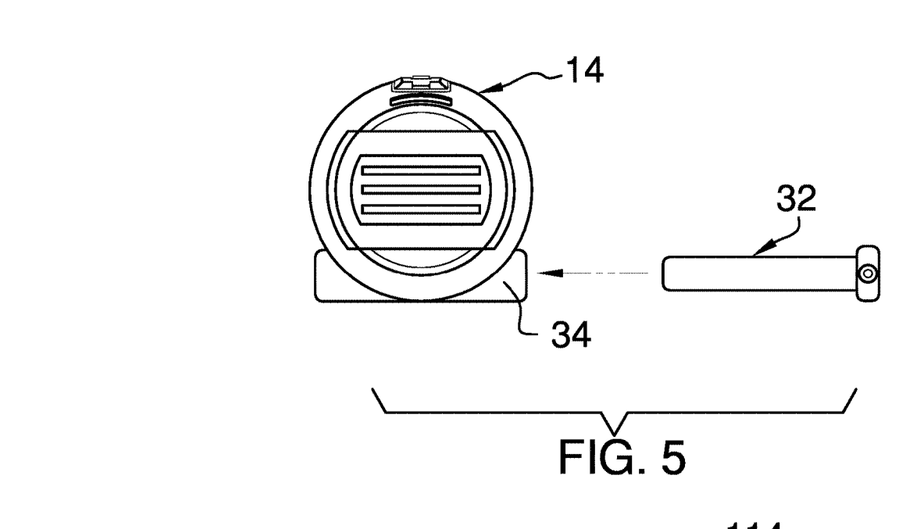
FIG. 5 is an end view of an embodiment of the disclosure.

In one embodiment of the invention, the power module 24 comprises a battery 32. The battery 32 is rechargeable. A port 34 is coupled to the housing 14. The port 34 is operationally coupled to the controller 26. The port 34 is complementary to the battery 32. The port 34 is positioned to insert the battery 32 to couple the battery 32 to the controller 26, as shown in FIG. 5. The controller 26 is positioned to operationally couple the battery 32 to the motor 18.

Figure 1:
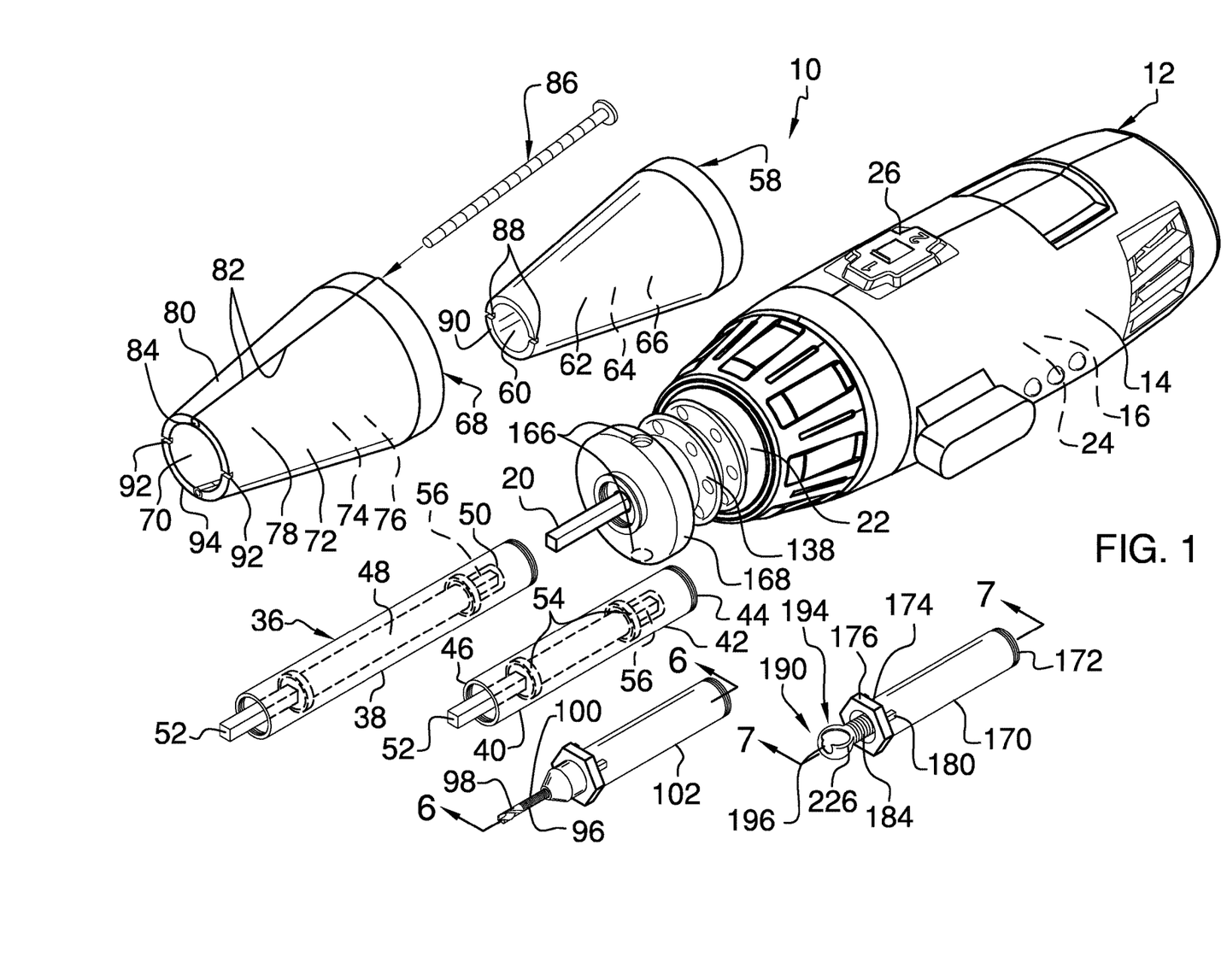
FIG. 1 is an isometric perspective view of an auto body repair assembly according to an embodiment of the disclosure.
Figure 2:
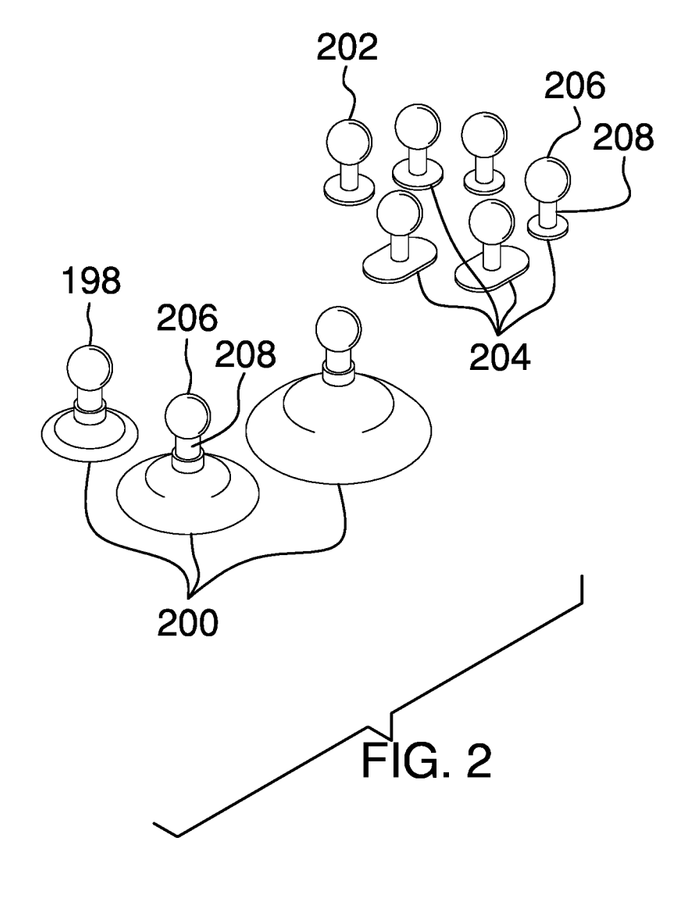
FIG. 2 is an isometric perspective view of an embodiment of the disclosure.
Figure 3:
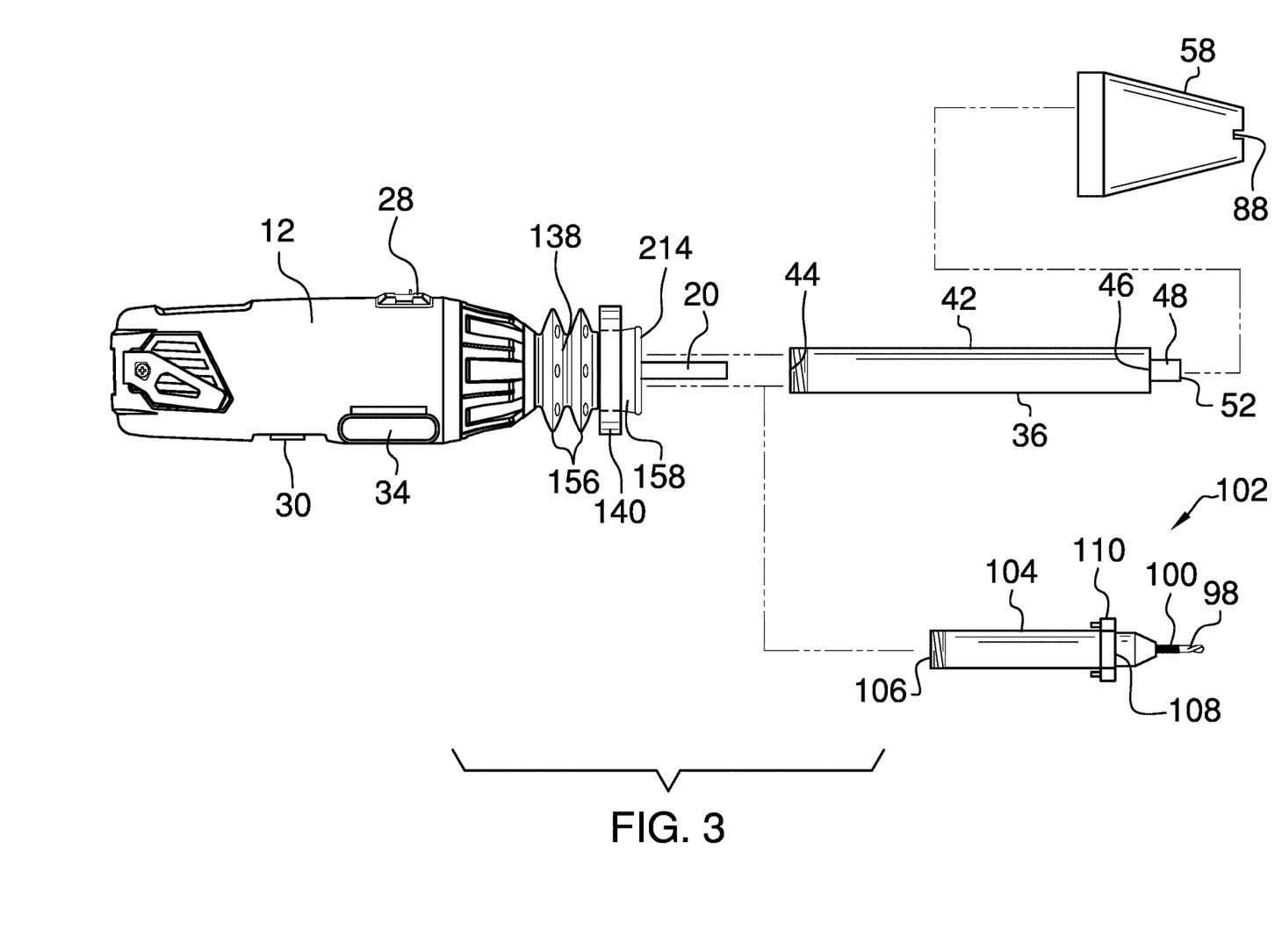
FIG. 3 is a side view of an embodiment of the disclosure.
Figure 4:
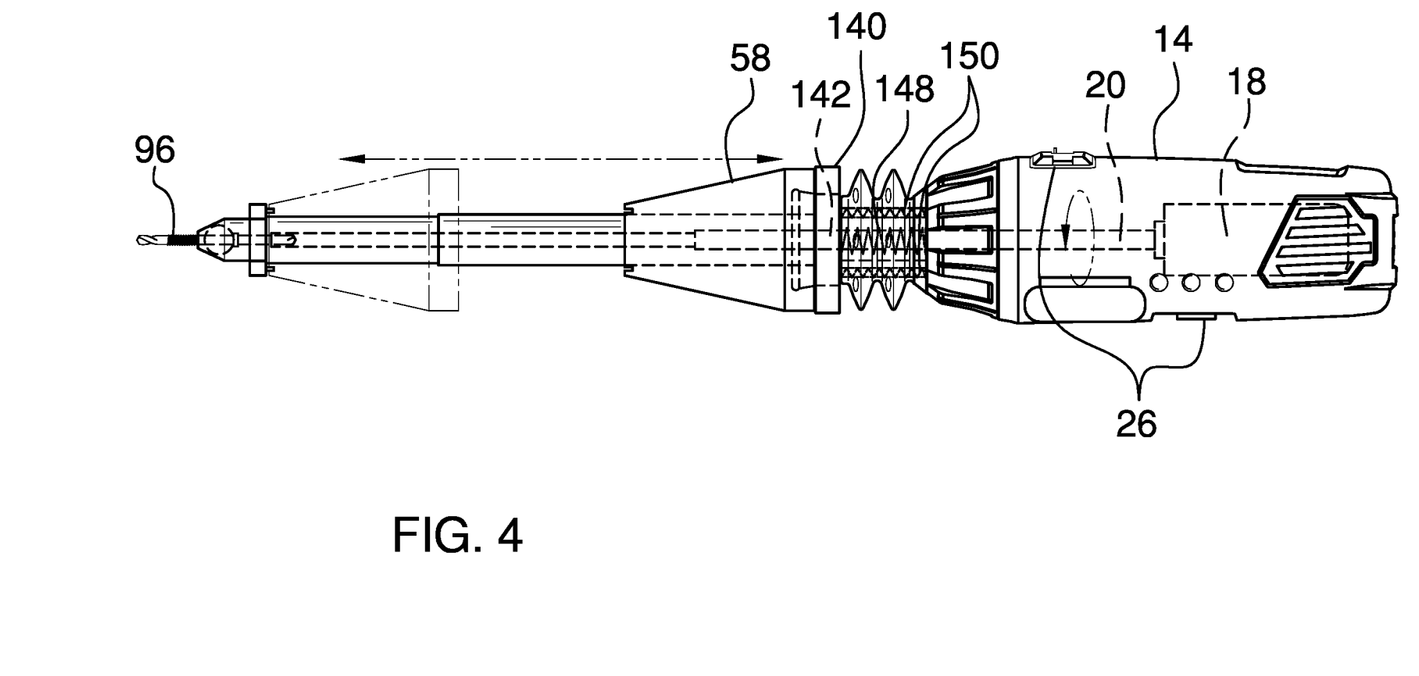
FIG. 4 is a side view of an embodiment of the disclosure.

An extender 36 may be operationally couplable to the shaft 20 of the rotary tool 12. The extender 36 comprises a first extender 38 and a second extender 40. The first extender 38 is longer than the second extender 40, as shown in FIG. 1. The first extender 38 and the second extender 40 each comprises a respective first tube 42 that has a first endpoint 44 and a second endpoint 46. The first endpoint 44 and the second endpoint 46 are open. The first endpoint 44 is positioned to insert the shaft 20 and is configured to couple to the rotary tool 12. The first tube 42 is circularly shaped when viewed longitudinally. The first tube 42 is externally threaded adjacent to the first endpoint 44. The first tube 42 is internally threaded adjacent to the second endpoint 46.

For each of the first extender 38 and second extender 40, a respective first rod 48 is positioned in and is rotationally coupled to the first tube 42. The first rod 48 has a first end 50 and a second end 52. The first end 50 is configured to couple to the shaft 20. The second end 52 extends from the second endpoint 46 of the first tube 42 providing an extension having the same shape as shaft 20. Each of a plurality of first bearings 54 is coupled to the first tube 42 and is rotationally coupled to the first rod 48. The first rod 48 is positioned to rotate within the first tube 42. The plurality of first bearings 54 comprises two first bearings 54 that are positioned singly proximate to the first endpoint 44 and the second endpoint 46 of the first tube 42. The first bearings 54 comprise ball bearings, bushings, rolling pins, or the like.

A first channel 56 extends through the first rod 48 into the first end 50 towards the second end 52 of the first rod 48. The first channel 56 is complementary to the shaft 20. The first channel 56 is positioned to insert the shaft 20 to couple the first rod 48 to the shaft 20. The shaft 20 is positioned to rotate the first rod 48 while being slidable within the first channel 56. The first channel 56 is squarely shaped when viewed from the first end 50.

A first cylinder 58 is positioned to insert the extender 36 so that the first cylinder 58 is slidably coupled to the extender 36. The first cylinder 58 is weighted. The first cylinder 58 is conical frustum shaped. The first cylinder 58 comprises a first inner wall 60 that is coupled to a first outer wall 62. The first inner wall 60 and the first outer wall 62 define a first interior space 64. A first aggregate 66 is positioned in the first interior space 64. The first aggregate 66 comprises sand or the like. The first aggregate 66 is positioned in the first interior space 64 to add mass to the first cylinder 58.

A second cylinder 68 is positioned to selectively insert the first cylinder 58 and to frictionally couple to the first cylinder 58. The first cylinder 58 and the second cylinder 68 are slidably coupled to the extender 36. The second cylinder 68 comprises a second inner wall 70 that is coupled to a second outer wall 72. The second inner wall 70 and the second outer wall 72 define a second interior space 74. A second aggregate 76 is positioned in the second interior space 74. The second aggregate 76 comprises sand or the like. The second aggregate 76 is positioned in the second interior space 74 to add mass to the second cylinder 68.

The second cylinder 68 comprises a first half cone 78 that is hingedly coupled to a second half cone 80. The first half cone 78 is selectively couplable to the second half cone 80. The second half cone 80 is pivotable relative to the first half cone 78 to an open configuration, wherein the first half cone 78 and the second half cone 80 are positioned to insert the first cylinder 58. The second half cone 80 is positioned to pivot relative to the first cylinder 58 to a closed configuration to frictionally couple the first half cone 78 and the second half cone 80 to the first cylinder 58.

The first half cone 78 and the second half cone 80 each have an edge 82. The edges 82 define a second channel 84 when the first half cone 78 and the second half cone 80 are positioned in the closed configuration. A pin 86, which is complementary to the second channel 84, is positioned to be inserted into the second channel 84 to couple the second half cone 80 to the first half cone 78, as shown in FIG. 1.

Each of a pair of first slots 88 is oppposingly positioned in a first circumference 90 of the first cylinder 58. Each of a pair of second slots 92 is oppposingly positioned in a second circumference 94 of the second cylinder 68.

A bit 96 is operationally couplable to the extender 36 distal from the rotary tool 12. The bit 96 has a first section 98 that is configured to penetrate sheet metal. The bit 96 has a second section 100 that is positioned between the first section 98 and the extender 36. The second section 100 is threaded. The second section 100 is configured to threadedly couple the bit 96 to the sheet metal.

The rotary tool 12 is positioned to rotate the bit 96 to penetrate the sheet metal and to position the second section 100 of the bit 96 to couple to the sheet metal. The first cylinder 58 is configured to be grasped in a hand of a user to selectively propel the first cylinder 58 along the extender 36 to the rotary tool 12 to apply force to a dent in the sheet metal to repair the dent. The second cylinder 68 is couplable to the first cylinder 58 if additional mass is required to generate sufficient force to repair the dent in the sheet metal.

Figure 6:
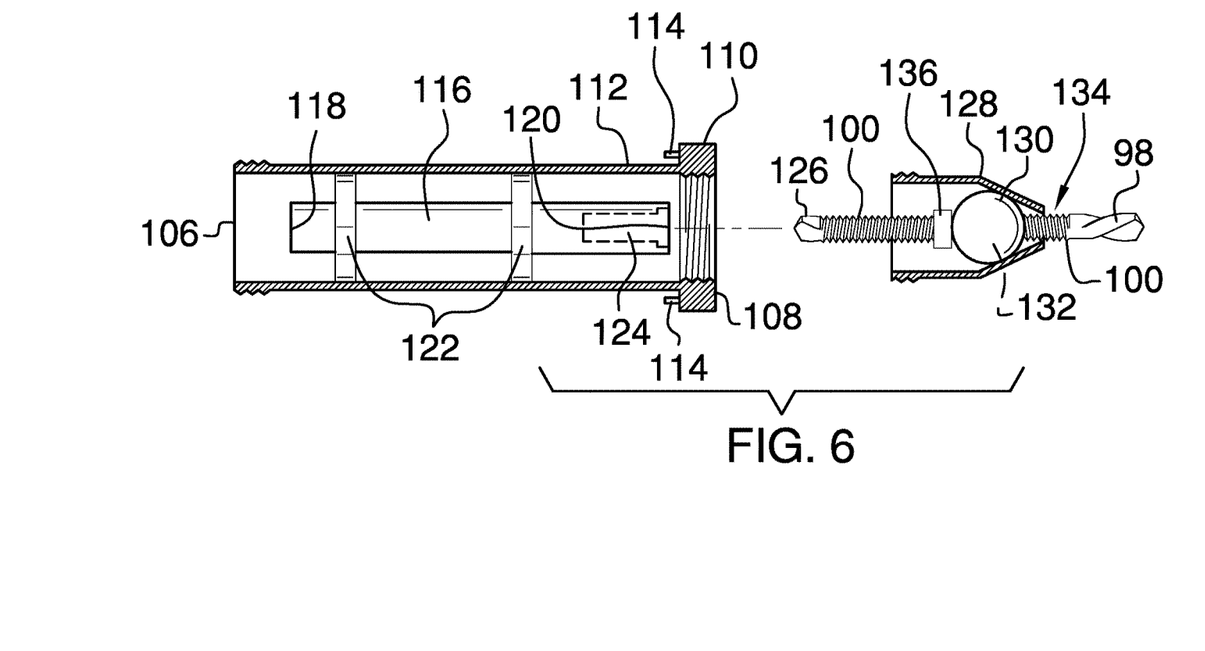
FIG. 6 is a cross-sectional view of an embodiment of the disclosure.
Figure 7:
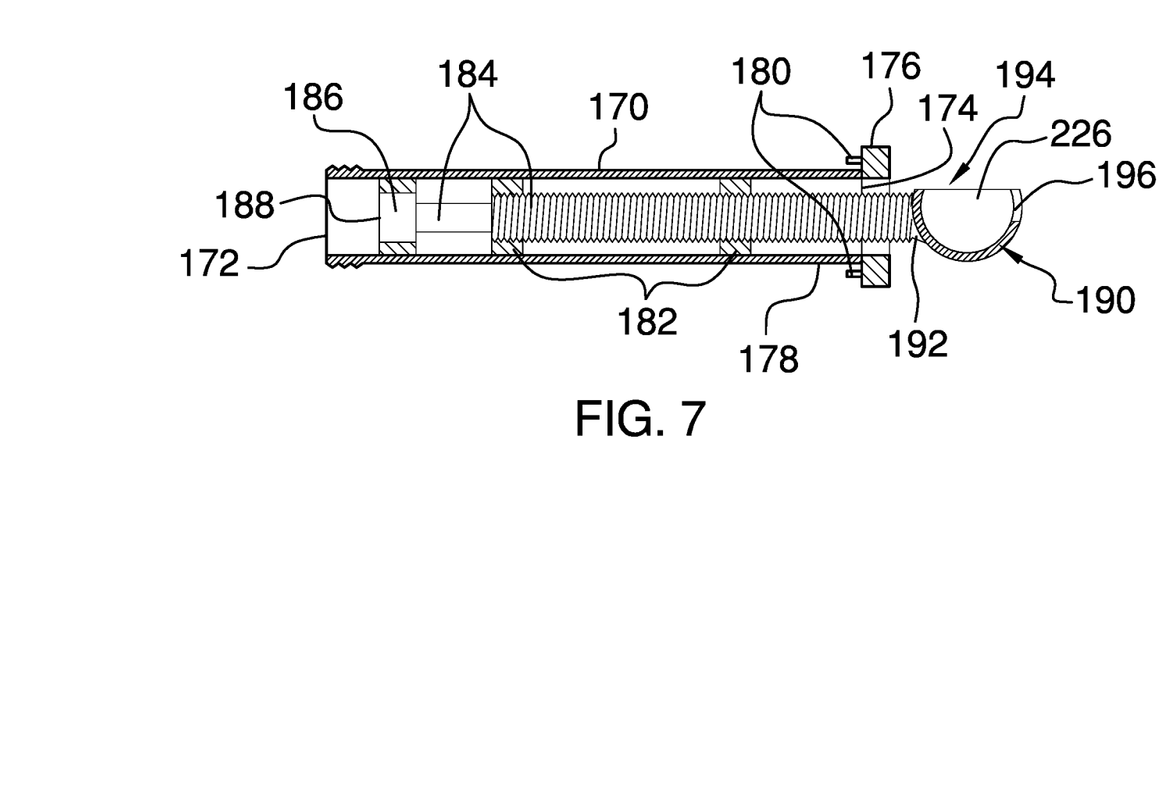
FIG. 7 is a cross-sectional view of an embodiment of the disclosure.
Figure 8:
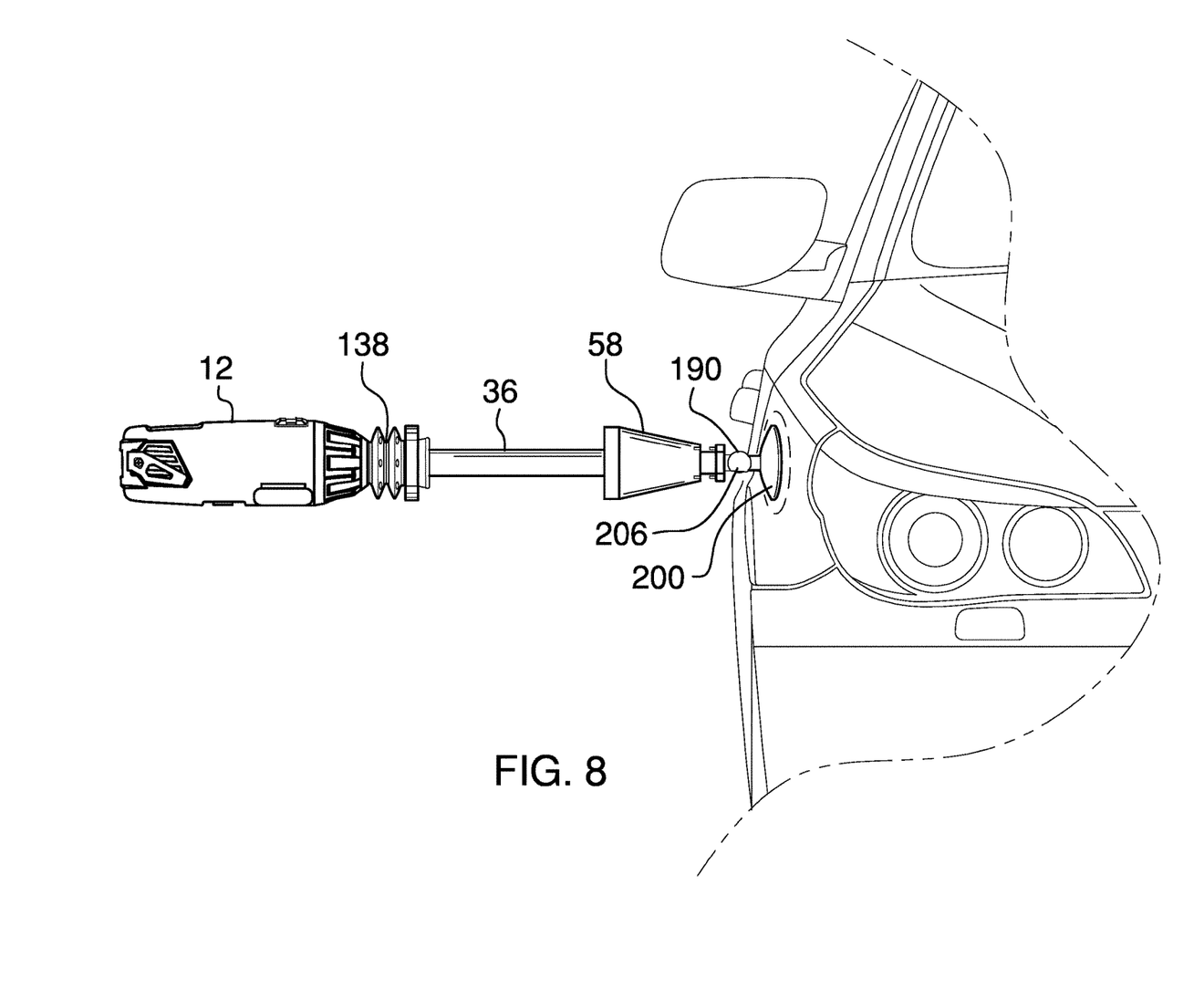
FIG. 8 is an in-use view of an embodiment of the disclosure.

A first coupler 102, shown in cross-section in FIG. 6, is selectively positionable between and couplable to the bit 96 and the extender 36. The first coupler 102 comprises a second tube 104 that has a first terminus 106 and a second terminus 108. The first terminus 106 and the second terminus 108 are open. The first terminus 106 is positioned to insert the first rod 48. The second tube 104 is circularly shaped when viewed longitudinally. The second tube 104 is externally threaded adjacent to the first terminus 106 so that the second tube 104 is positioned to couple to the second endpoint 46 of the first tube 42 to couple the second tube 104 to the extender 36. The second tube 104 is internally threaded adjacent to the second terminus 108.

A first nut 110 is coupled to an outer perimeter 112 of the second tube 104 adjacent to the second terminus 108. The first nut 110 is positioned to couple to a wrench to threadedly couple the first terminus 106 of the second tube 104 to the second endpoint 46 of the first tube 42.

Each of a pair of first protrusions 114 is coupled to and extends from the first nut 110 toward the first terminus 106 of the second tube 104. The first protrusions 114 are complementary to the first slots 88 and the second slots 92. Each first protrusion 114 is positioned to be selectively inserted into a respective first slot 88 and a respective second slot 92. The user is positioned to selectively grasp the first cylinder 58 and the second cylinder 68 to rotate the second tube 104.

A second rod 116 is positioned in and is rotationally coupled to the second tube 104. The second rod 116 has a first end 118 and a second end 120. The first end 118 of the second rod 116 is configured to couple to the second end 52 of the first rod 48. The first rod 48 is positioned to transfer rotation of the shaft 20 to the second rod 116. Each of a plurality of second bearings 122 is coupled to the second tube 104 and is rotationally coupled to the second rod 116. The second rod 116 is positioned to rotate within the second tube 104. The plurality of second bearings 122 comprises two second bearings 122. The second bearings 122 comprise ball bearings, bushings, rolling pins, or the like.

A third channel 124 extends into the second rod 116 from the second end 120 of the second rod 116. The third channel 124 is squarely shaped when viewed from the second end 120 of the second rod 116. The bit 96 has a third section 126 that is complementary to the third channel 124. The third channel 124 is positioned to insert the third section 126 of the bit 96 to couple the bit 96 to the second rod 116.

A cap 128 is threadedly couplable to the second terminus 108 of the second tube 104. A first ball 130 is positioned in the cap 128. A fourth channel 132 is positioned through the first ball 130 so that the bit 96 is positionable through the first ball 130 with the first section 98 and the second section 100 the bit 96 protruding through a first opening 134 that is positioned in the cap 128. A second nut 136 is threadedly coupled to the bit 96 between the first ball 130 and the second tube 104. The second nut 136 is adjustably positionable on the bit 96 to adjust the protrusion of the second section 100 of the bit 96 from the cap 128.

A dampening module 138 is positioned around the shaft 20 and is coupled to the front 22 of the housing 14. The dampening module 138 is operationally coupled to the extender 36. The dampening module 138 is positioned to shield the housing 14 from impact by the first cylinder 58 as the first cylinder 58 is motivated along the extender 36 toward the housing 14.

The dampening module 138 comprises a disk 140 that is substantially circularly shaped. A first hole 142 is centrally positioned through the disk 140. The shaft 20 is inserted through and selectively rotatable within the first hole 142. A first box 144 is coupled to the disk 140 and extends toward the housing 14. The first box 144 is open-faced distal from the disk 140. A second box 146 is coupled to the housing 14 and extends toward the disk 140. The second box 146 is open-faced distal from the housing 14. The second box 146 is slidably positionable within the first box 144.

A first spring 148 is positioned around the shaft 20. The first spring 148 is coupled to and extends between the front 22 of the housing 14 and the disk 140. The first spring 148 is positioned to be tensioned as the disk 140 is motivated toward the front 22 of the housing 14. Each of a set of four second springs 150 is coupled proximate to and extends between a respective corner 152 of the first box 144 and an associated corner 154 of the second box 146. The second springs 150 are positioned to be tensioned as the first box 144 is motivated toward the second box 146.

A bellows 156 is positioned around the first box 144 and the second box 146. The bellows 156 is coupled to and extends between the front 22 of the housing 14 and the disk 140. The bellows 156 is positioned to compress air that is positioned in the bellows 156 as the disk 140 in motivated toward the front 22 of the housing 14. The first spring 148, the second springs 150, and the bellows 156 work in combination to reduce the impact to the housing 14 from the first cylinder 58 impacting the disk 140. The impact to the housing 14 also is reduced when the second cylinder 68 is utilized in combination with the first cylinder 58. The first aggregate 66 and the second aggregate 76 help to absorb vibrations generated by impact to the disk 140 of the first cylinder 58 and the second cylinder 68, respectively, to reduce transfer of vibrations to the hand.

A ring 158 is coupled to and extends from the disk 140. The ring 158 is oppositely positioned relative to the first spring 148. The ring 158 is internally threaded. The ring 158 is positioned to threadedly insert the first endpoint 44 of the first tube 42 to couple the first tube 42 to the dampening module 138.

A handle 160 is selectively couplable to the disk 140. The handle 160 is configured to be grasped in the hand of the user to stabilize the rotary tool 12 relative to a work piece. The handle 160 comprises a bar 162 that is circularly shaped when viewed longitudinally. A bolt 164 is coupled to and extends from the bar 162. The bolt 164 is threaded. Each of a pair of second holes 166 is oppositely positioned in a perimeter 168 of the disk 140. The second holes 166 are complementary to the bolt 164. Each second hole 166 is positioned to selectively threadedly insert the bolt 164 to couple the bar 162 to the disk 140 so that the handle 160 is selectively positionable relative to the housing 14.

The assembly 10 comprises a third tube 170 that has a first terminus 172 and a second terminus 174. The first terminus 172 and the second terminus 174 of the third tube 170 are open. The first terminus 172 is positioned to insert the shaft 20. The third tube 170 is circularly shaped when viewed longitudinally. The third tube 170 is externally threaded adjacent to the first terminus 172 so that the third tube 170 is positioned to couple to the ring 158 to couple the third tube 170 to the dampening module 138.

A third nut 176 is coupled to an outer circumference 178 of the third tube 170 adjacent to the second terminus 174. The third nut 176 is positioned to couple to the wrench to threadedly couple the first terminus 172 of the third tube 170 to the ring 158 to couple the third tube 170 to the dampening module 138.

Each of a pair of second protrusions 180 is coupled to and extends from the third nut 176 toward the first terminus 172 of the third tube 170. The second protrusions 180 are complementary to the first slots 88 and the second slots 92.

Each of a pair of fourth nuts 182 is coupled to and is positioned in the third tube 170. A third rod 184 is positioned in the third tube 170. The third rod 184 is threaded and is threadedly coupled to the fourth nuts 182.

A second coupler 186 is coupled to a first end 188 of the third rod 184. The second coupler 186 is configured to couple to the shaft 20 to couple the third rod 184 to the shaft 20 so that the shaft 20 is positioned to rotate the third rod 184.

A third coupler 190 is coupled to a second end 192 of the third rod 184. The third coupler 190 protrudes from the second terminus 174 of the third tube 170. The third coupler 190 comprises a shell 226. The shell 226 is hollow. The shell 226 is spherically shaped or the like. A second opening 194 is positioned in the shell 226. The second opening 194 is circularly shaped or the like. A third slot 196 extends from the second opening 194.

The third coupler 190 is complementary to a fourth coupler 198 that is coupled to a suction cup 200. The third coupler 190 also is complementary to a fifth coupler 202 that is coupled to a glue tab 204. Each fourth coupler 198 and each fifth coupler 202 comprise a second ball 206 and a stick 208. The second opening 194 that is positioned in the shell 226 is positioned to insert a respective second ball 206, positioning an associated stick 208 in the third slot 196.

The assembly 10 comprises a cone 210. The cone 210 is frustum shaped and defines an apex 212 of the cone 210. The apex 212 is open and is positioned to insert the third tube 170. The apex 212 is complementary to a rim 214 that is coupled to the ring 158 distal from the disk 140. The apex 212 is positioned to insert the rim 214 to frictionally couple the cone 210 to the dampening module 138 with the third tube 170 positioned within the cone 210. A third opening 216 is positioned in the cone 210. The third opening 216 extends from the apex 212 to a base 218 of the cone 210. The base 218 of the cone 210 is open.

Each of a plurality of plates 220 is selectively couplable to the base 218 of the cone 210. Each of a plurality of fifth channels 222 is positioned in a respective plate 220. The fifth channel 222 is positioned to selectively insert the base 218 of the cone 210 to couple the cone 210 to the respective plate 220. Each of a plurality of orifices 224 is centrally positioned in an associated plate 220. Each orifice 224 has a respective size and a respective shape so that the plurality of orifices 224 comprises a variety of sizes and shapes that is complementary to the sizes and the shapes of a set of the suction cups 200 and a set of the glue tabs 204.

Figure 9:
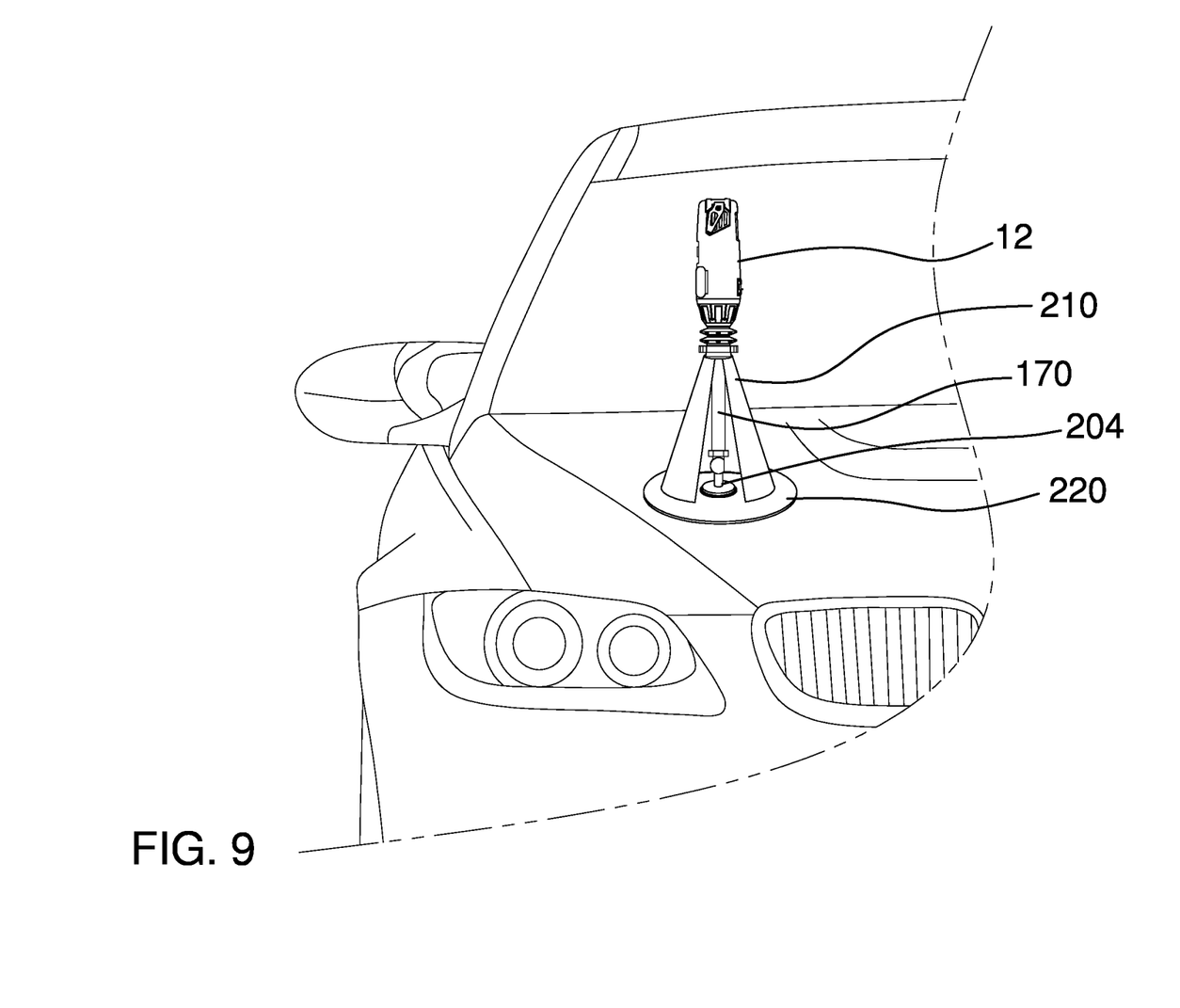
FIG. 9 is an in-use view of an embodiment of the disclosure.
Figure 10:
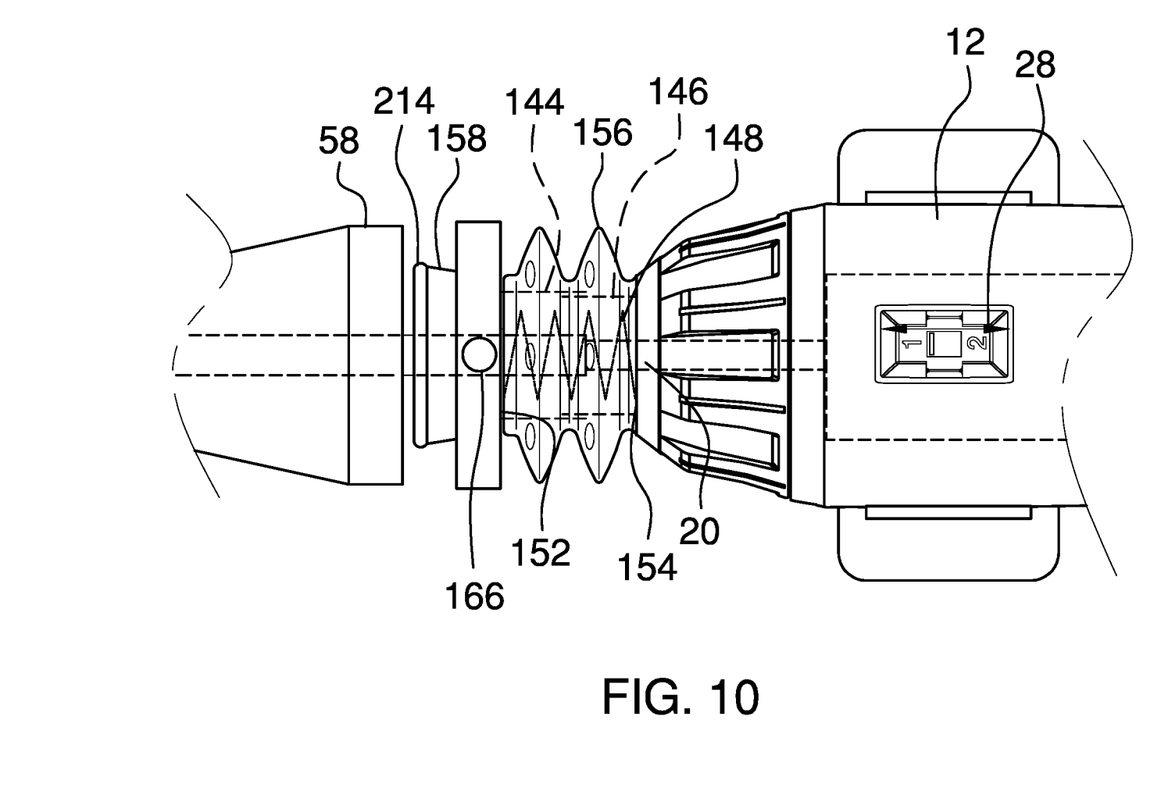
FIG. 10 is a detail view of an embodiment of the disclosure.

In use, the user selects a respective suction cup 200 or a respective glue tab 204 that is appropriate for the dent that is to be repaired. When using the respective glue tab 204, the respective glue tab 204 is glued to the dent. The respective plate 220 having the appropriately sized and shaped orifice 224 is coupled to the cone 210 and is positioned over the respective glue tab 204, as shown in FIG. 9. The associated fifth coupler 202 of the respective glue tab 204 is coupled to third coupler 190 to couple the respective glue tab 204 to the third rod 184. When the third rod 184 is rotated by the shaft 20 in the reverse direction, the third rod 184 travels within the third tube 170 toward the rotary tool 12 and exerts an upward force on the respective glue tab 204 that is transferred to the sheet metal to repair the dent. The plate 220 serves to distribute a counterforce to the sheet metal surrounding the dent. The third opening 216 that is positioned in the cone 210 allows the user to visualize the dent repair.

A similar method may be employed when utilizing the respective suction cup 200 to repair the dent. In this method, the fourth coupler 198 of the respective suction cup 200 is coupled to the third coupler 190. The respective plate 220 having the appropriately sized and shaped orifice 224 then is coupled to the cone 210 and the respective suction cup 200 is positioned over the dent. The third rod 184 is rotated by the shaft 20 first in the forward direction so that the third rod 184 travels within the third tube 170 away from the rotary tool 12 and exerts a downward force on the respective suction cup 200 to couple the respective suction cup 200 to the dent in the sheet metal. The third rod 184 then is rotated by the shaft 20 in the reverse direction so that the third rod 184 travels within the third tube 170 toward the rotary tool 12 and exerts the upward force on the respective suction cup 200 that is transferred to the sheet metal to repair the dent.

The rotary tool 12 is positioned to rotate the bit 96 to penetrate the sheet metal and to position the second section 100 of the bit 96 to couple to the sheet metal. The first cylinder 58 is configured to be grasped in the hand of the user to selectively propel the first cylinder 58 along the extender 36 to the disk 140 to apply the force to the dent in the sheet metal to repair the dent.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An auto body repair assembly comprising:
   a rotary tool;
   an extender operationally couplable to a shaft of said rotary tool;
   a first cylinder positioned for inserting said extender such that said first cylinder is slidably coupled to said extender, said first cylinder being weighted;
   a bit operationally couplable to said extender distal from said rotary tool, said bit having a first section configured for penetrating sheet metal, said bit having a second section positioned between said first section and said extender, said second section being threaded such that said second section is configured for threadedly coupling said bit to the sheet metal;
   wherein said bit is positioned on said extender such that said rotary tool is positioned for rotating said bit for penetrating the sheet metal positioning said second section of said bit for coupling to the sheet metal, wherein said first cylinder is positioned on said extender such that said first cylinder is configured for grasping in a hand of a user for selectively propelling said first cylinder along said extender to said rotary tool for applying force to a dent in the sheet metal for repairing the dent;
   said first cylinder being conical frustum shaped;
   said first cylinder comprising a first inner wall coupled to a first outer wall such that said first inner wall and said first outer wall define a first interior space;
   a first aggregate positioned in said first interior space; and
   a pair of first slots opposingly positioned in a first circumference of said first cylinder;
   a second cylinder positioned for selectively inserting said first cylinder and for frictionally coupling to said first cylinder such that said first cylinder and said second cylinder are slidably coupled to said extender;
   said second cylinder comprising a second inner wall coupled to a second outer wall such that said second inner wall and said second outer wall define a second interior space;
   a second aggregate positioned in said second interior space; and
   a pair of second slots opposingly positioned in a second circumference of said second cylinder.

2. The assembly of claim 1, further including said rotary tool being selectively reversible.

3. The assembly of claim 2, further including said rotary tool comprising:
   a housing defining an internal space;
   a motor coupled to said housing and positioned in said internal space, said shaft being coupled to said motor and extending from a front of said housing;
   a power module coupled to said housing and positioned in said internal space, said power module being operationally coupled to said motor; and
   a controller coupled to said housing, said controller being operationally coupled to said motor, said controller being configured for selectively controlling a rotational speed of said shaft and a direction of rotation of said shaft.

4. The assembly of claim 3, further including said controller comprising a toggle switch and a slide switch, said toggle switch being positioned for toggling between a high rotational speed and a low rotational speed of said shaft, said slide switch being positioned for selecting a forward direction of rotation and reverse direction of rotation for said shaft.

5. The assembly of claim 3, further including said power module being configured for coupling said motor to a source of alternating current.

6. The assembly of claim 3, further including said power module being configured for coupling said motor to a compressed air supply.

7. The assembly of claim 3, further comprising:
said power module comprising a battery, said battery being rechargeable;
a port coupled to said housing, said port being operationally coupled to said controller, said port being complementary to said battery; and
wherein said port is positioned on said housing such that said port is positioned for inserting said battery for coupling said battery to said controller positioning said controller for operationally coupling said battery to said motor.

8. The assembly of claim 1, further including said extender comprising a first extender and a second extender, said first extender being longer than said second extender.

9. The assembly of claim 1, further including said extender comprising a first extender and a second extender each comprising: a first tube having a first endpoint and a second endpoint, said first endpoint and said second endpoint being open, said first endpoint being positioned for inserting said shaft and configured for coupling to said rotary tool, said first tube being circularly shaped when viewed longitudinally, said first tube being externally threaded adjacent to said first endpoint, said first tube being internally threaded adjacent to said second endpoint; a first rod positioned in and rotationally coupled to said first tube, said first rod having a first end and a second end, said first end being configured for coupling to said shaft, said second end extending from said second endpoint of said first tube; a plurality of first bearings, each said first bearing being coupled to said first tube and rotationally coupled to said first rod such that said first rod is positioned for rotating within said first tube, said plurality of first bearings comprising two said first bearings positioned singly proximate to said first endpoint and said second endpoint of said first tube; a first channel extending through said first rod from said first end to said second end, said first channel being complementary to said shaft, said first channel being squarely shaped when viewed from said first end; and wherein said first channel is positioned in said first rod such that said first channel is positioned for inserting said shaft for coupling said first rod to said shaft such that said shaft is positioned for rotating said first rod.

10. The assembly of claim 1, further including said first aggregate and said second aggregate comprising sand.

11. The assembly of claim 1, further comprising:
said second cylinder comprising a first half cone hingedly coupled to a second half cone, said first half cone being selectively couplable to said second half cone, wherein said second half cone is pivotable relative to said first half cone to an open configuration such that said first half cone and said second half cone are positioned for inserting said first cylinder, wherein said second half cone is positioned to pivot relative to said first cylinder to a closed configuration for frictionally coupling said first half cone and said second half cone to said first cylinder, said first half cone and said second half cone each having an edge, said edges defining a second channel when said first half cone and said second half cone are positioned in the closed configuration;
a pin complementary to said second channel; and
wherein said second channel is positioned in said second cylinder such that said second channel is positioned for inserting said pin for coupling said second half cone to said first half cone.

12. The assembly of claim 1, further comprising:
a first coupler selectively positionable between and couplable to said bit and said extender, said first coupler comprising:
a second tube having a first terminus and a second terminus, said first terminus and said second terminus being open, said first terminus being positioned for inserting said first rod, said second tube being circularly shaped when viewed longitudinally, said second tube being externally threaded adjacent to said first terminus such that said second tube is positioned for coupling to said second endpoint of said first tube for coupling said second tube to said extender, said second tube being internally threaded adjacent to said second terminus,
a first nut coupled to an outer perimeter of said second tube adjacent to said second terminus,
a pair of first protrusions, each said first protrusion being coupled to and extending from said first nut toward said first terminus of said second tube, said first protrusions being complementary to said first slots and said second slots,
a second rod positioned in and rotationally coupled to said second tube, said second rod having a first end and a second end, said first end of said second rod being configured for coupling to said second end of said first rod such that said first rod is positioned for transferring rotation of said shaft to said second rod,
a plurality of second bearings, each said second bearing being coupled to said second tube and rotationally coupled to said second rod such that said second rod is positioned for rotating within said second tube, said plurality of second bearings comprising two said second bearings,
a third channel extending into said second rod from said second end of said second rod, said third channel being squarely shaped when viewed from said second end of said second rod, said bit having a third section complementary to said third channel such that said third channel is positioned for inserting said third section of said bit for coupling said bit to said second rod,
a cap threadedly couplable to said second terminus of said second tube
a first ball positioned in said cap,
a fourth channel positioned through said first ball such that said bit is positionable through said first ball such that said first section and said second section said bit protrude through a first opening positioned in said cap, and
a second nut threadedly coupled to said bit between said first ball and said second tube, said second nut being adjustably positionable on said bit for adjusting the protrusion of said second section of said bit from said cap; and wherein said first nut is positioned on said second tube such that said first nut is positioned for coupling to a wrench for threadedly coupling said first terminus of said second tube to said second endpoint of said first tube;

wherein said first protrusions are positioned on said first nut such that each said first protrusion is positioned for inserting into a respective said first slot and a respective said second slot such that the user is positioned for grasping said second cylinder for rotating said second tube.

13. The assembly of claim 9, further including a dampening module positioned around said shaft and coupled to said front of said housing, said dampening module being operationally coupled to said extender, wherein said dampening module is positioned on said housing such that said dampening module is positioned for shielding said housing from impact by said first cylinder as said first cylinder is motivated along said extender toward said housing.

14. An auto body repair assembly comprising: a rotary tool; an extender operationally couplable to a shaft of said rotary tool; a first cylinder positioned for inserting said extender such that said first cylinder is slidably coupled to said extender, said first cylinder being weighted; a bit operationally couplable to said extender distal from said rotary tool, said bit having a first section configured for penetrating sheet metal, said bit having a second section positioned between said first section and said extender, said second section being threaded such that said second section is configured for threadedly coupling said bit to the sheet metal; wherein said bit is positioned on said extender such that said rotary tool is positioned for rotating said bit for penetrating the sheet metal positioning said second section of said bit for coupling to the sheet metal, wherein said first cylinder is positioned on said extender such that said first cylinder is configured for grasping in a hand of a user for selectively propelling said first cylinder along said extender to said rotary tool for applying force to a dent in the sheet metal for repairing the dent; said extender comprising a first extender and a second extender each comprising: a first tube having a first endpoint and a second endpoint, said first endpoint and said second endpoint being open, said first endpoint being positioned for inserting said shaft and configured for coupling to said rotary tool, said first tube being circularly shaped when viewed longitudinally, said first tube being externally threaded adjacent to said first endpoint, said first tube being internally threaded adjacent to said second endpoint; a first rod positioned in and rotationally coupled to said first tube, said first rod having a first end and a second end, said first end being configured for coupling to said shaft, said second end extending from said second endpoint of said first tube; a plurality of first bearings, each said first bearing being coupled to said first tube and rotationally coupled to said first rod such that said first rod is positioned for rotating within said first tube, said plurality of first bearings comprising two said first bearings positioned singly proximate to said first endpoint and said second endpoint of said first tube; a first channel extending through said first rod from said first end to said second end, said first channel being complementary to said shaft, said first channel being squarely shaped when viewed from said first end; and wherein said first channel is positioned in said first rod such that said first channel is positioned for inserting said shaft for coupling said first rod to said shaft such that said shaft is positioned for rotating said first rod; and a dampening module positioned around said shaft and coupled to said front of said housing, said dampening module being operationally coupled to said extender, wherein said dampening module is positioned on said housing such that said dampening module is positioned for shielding said housing from impact by said first cylinder as said first cylinder is motivated along said extender toward said housing, said dampening module comprising: a disk, said disk being substantially circularly shaped; a first hole centrally positioned through said disk, said shaft being inserted through and selectively rotatable within said first hole; a first box coupled to said disk and extending toward said housing, said first box being open-faced distal from said disk; a second box coupled to said housing and extending toward said disk, said second box being open-faced distal from said housing, said second box being slidably positionable within said first box; a first spring positioned around said shaft, said first spring being coupled to and extending between said front of said housing and said disk such that said first spring is positioned for tensioning as said disk is motivated toward said front of said housing; a set of four second springs, each said second spring being coupled proximate to and extending between a respective corner of said first box and an associated corner of said second box such that said second springs are positioned for tensioning as said first box is motivated toward said second box; a ring coupled to and extending from said disk, said ring being opposing to said first spring, said ring being internally threaded such that said ring is positioned for threadedly inserting said first endpoint of said first tube for coupling said first tube to said dampening module; and a bellows positioned around said first box and said second box, said bellows being coupled to and extending between said front of said housing and said disk such that said bellows is positioned for compressing air positioned in said bellows as said disk is motivated toward said front of said housing.

15. The assembly of claim 14, further comprising:
a handle selectively couplable to said disk, said handle comprising:
  a bar, said bar being circularly shaped when viewed longitudinally,
  a bolt coupled to and extending from said bar, said bolt being threaded, and
  a pair of second holes opposingly positioned in a perimeter of said disk, said second holes being complementary to said bolt; and
wherein said second holes are positioned in said disk such that each said second hole is positioned for selectively threadedly inserting said bolt for coupling said bar to said disk such that said handle is configured for grasping in a hand of the user for stabilizing said rotary tool relative to a work piece.

16. The assembly of claim 14, further comprising:
a third tube having a first terminus and a second terminus, said first terminus and said second terminus being open, said first terminus being positioned for inserting said shaft, said third tube being circularly shaped when viewed longitudinally, said third tube being externally threaded adjacent to said first terminus such that said third tube is positioned for coupling to said ring for coupling said third tube selectively and interchangeably to one of said dampening module and said extender;
a third nut coupled to an outer circumference of said third tube adjacent to said second terminus, wherein said third nut is positioned on said third tube such that said third nut is positioned for coupling to the wrench for threadedly coupling said first terminus of said third tube to said ring for coupling said third tube to said dampening module;
a pair of second protrusions, each said second protrusion being coupled to and extending from said third nut toward said first terminus of said third tube, said second protrusions being complementary to said first slots and said second slots;
a pair of fourth nuts, each said fourth nut being coupled to and positioned in said third tube;
a third rod positioned in said third tube, said third rod being threaded, said third rod being threadedly coupled to said fourth nuts;
a second coupler coupled to a first end of said third rod, said second coupler being configured for coupling to said shaft for coupling said third rod to said shaft such that said shaft is positioned for rotating said third rod;
a third coupler coupled to a second end of said third rod such that said third coupler protrudes from said second terminus of said third tube, said third coupler being complementary to a fourth coupler coupled to a suction cup, said third coupler being complementary to a fifth coupler coupled to a glue tab;
a rim coupled to said ring distal from said disk;
a cone, said cone being frustum shaped defining an apex, said apex being open such that said apex is positioned for inserting said third tube, said apex being complementary to said rim such that said apex is positioned for inserting said rim for frictionally coupling said cone to said dampening module positioning said third tube within said cone;
a plurality of plates, each said plate being selectively couplable to a base of said cone, said base being open;
a plurality of fifth channels, each said fifth channel being positioned in a respective said plate such that said fifth channel is positioned for selectively inserting said base of said cone for coupling said cone to said respective said plate;
a third opening positioned in said cone, said third opening extending from said apex to said base; and
a plurality of orifices, each said orifice being centrally positioned in an associated said plate, each said orifice having a respective size and a respective shape such that said plurality of orifices comprises a variety of sizes and shapes complementary to the sizes and the shapes of a set of said suction cups and a set of said glue tabs.

17. The assembly of claim 16, further comprising:
each said fourth coupler and each said fifth coupler comprising a second ball and a stick;
said third coupler comprising:
    a shell, said shell being hollow, said shell being spherically shaped,
    a second opening positioned in said shell, said second opening being circularly shaped, and
    a third slot extending from said second opening; and
wherein said second opening is positioned in said shell such that said second opening is positioned for inserting a respective said second ball positioning an associated said stick in said third slot.

18. An auto body repair assembly comprising:
a rotary tool, said rotary tool being selectively reversible, said rotary tool comprising:
    a housing defining an internal space,
    a motor coupled to said housing and positioned in said internal space,
    a power module coupled to said housing and positioned in said internal space, said power module being operationally coupled to said motor, said power module being configured for coupling said motor to a source of alternating current, said power module being configured for coupling said motor to a compressed air supply, said power module comprising a battery, said battery being rechargeable,
    a shaft coupled to said motor and extending from a front of said housing, and
    a controller coupled to said housing, said controller being operationally coupled to said motor, said controller being configured for selectively controlling a rotational speed of said shaft and a direction of rotation of said shaft, said controller comprising a toggle switch and a slide switch, said toggle switch being positioned for toggling between a high rotational speed and a low rotational speed of said shaft, said slide switch being positioned for selecting a forward direction of rotation and reverse direction of rotation for said shaft;
a port coupled to said housing, said port being operationally coupled to said controller, said port being complementary to said battery, wherein said port is positioned on said housing such that said port is positioned for inserting said battery for coupling said battery to said controller positioning said controller for operationally coupling said battery to said motor;
an extender operationally couplable to said shaft of said rotary tool, said extender comprising a first extender and a second extender, said first extender being longer than said second extender, said first extender and said second extender each comprising:
    a first tube having a first endpoint and a second endpoint, said first endpoint and said second endpoint being open, said first endpoint being positioned for inserting said shaft and configured for coupling to said rotary tool, said first tube being circularly shaped when viewed longitudinally, said first tube being externally threaded adjacent to said first endpoint, said first tube being internally threaded adjacent to said second endpoint,
    a first rod positioned in and rotationally coupled to said first tube, said first rod having a first end and a second end, said first end being configured for coupling to said shaft, said second end extending from said second endpoint of said first tube,
    a plurality of first bearings, each said first bearing being coupled to said first tube and rotationally coupled to said first rod such that said first rod is positioned for rotating within said first tube, said plurality of first bearings comprising two said first bearings positioned singly proximate to said first endpoint and said second endpoint of said first tube, and
    a first channel extending through said first rod from said first end to said second end, said first channel being complementary to said shaft, wherein said first channel is positioned in said first rod such that said first channel is positioned for inserting said shaft for coupling said first rod to said shaft such that said shaft is positioned for rotating said first rod, said first channel being squarely shaped when viewed from said first end;
a first cylinder positioned for inserting said extender such that said first cylinder is slidably coupled to said extender, said first cylinder being weighted, said first cylinder being conical frustum shaped, said first cylinder comprising a first inner wall coupled to a first outer wall such that said first inner wall and said first outer wall define a first interior space;

a second cylinder positioned for selectively inserting said first cylinder and for frictionally coupling to said first cylinder such that said first cylinder and said second cylinder are slidably coupled to said extender, said second cylinder comprising a second inner wall coupled to a second outer wall such that said second inner wall and said second outer wall define a second interior space, said second cylinder comprising a first half cone hingedly coupled to a second half cone, said first half cone being selectively couplable to said second half cone, wherein said second half cone is pivotable relative to said first half cone to an open configuration such that said first half cone and said second half cone are positioned for inserting said first cylinder, wherein said second half cone is positioned to pivot relative to said first cylinder to a closed configuration for frictionally coupling said first half cone and said second half cone to said first cylinder, said first half cone and said second half cone each having an edge, said edges defining a second channel when said first half cone and said second half cone are positioned in the closed configuration;

a pin complementary to said second channel, wherein said second channel is positioned in said second cylinder such that said second channel is positioned for inserting said pin for coupling said second half cone to said first half cone;

a pair of first slots opposingly positioned in a first circumference of said first cylinder;

a pair of second slots opposingly positioned in a second circumference of said second cylinder;

a first aggregate positioned in said first interior space, said first aggregate comprising sand;

a second aggregate positioned in said second interior space, said second aggregate comprising sand;

a bit operationally couplable to said extender distal from said rotary tool, said bit having a first section configured for penetrating sheet metal, said bit having a second section positioned between said first section and said extender, said second section being threaded such that said second section is configured for threadedly coupling said bit to the sheet metal, wherein said bit is positioned on said extender such that said rotary tool is positioned for rotating said bit for penetrating the sheet metal positioning said second section of said bit for coupling to the sheet metal, wherein said first cylinder is positioned on said extender such that said first cylinder is configured for grasping in a hand of a user for selectively propelling said first cylinder along said extender to said rotary tool for applying force to a dent in the sheet metal for repairing the dent;

a first coupler selectively positionable between and couplable to said bit and said extender, said first coupler comprising:

a second tube having a first terminus and a second terminus, said first terminus and said second terminus being open, said first terminus being positioned for inserting said first rod, said second tube being circularly shaped when viewed longitudinally, said second tube being externally threaded adjacent to said first terminus such that said second tube is positioned for coupling to said second endpoint of said first tube for coupling said second tube to said extender, said second tube being internally threaded adjacent to said second terminus, a first nut coupled to an outer perimeter of said second tube adjacent to said second terminus, wherein said first nut is positioned on said second tube such that said first nut is positioned for coupling to a wrench for threadedly coupling said first terminus of said second tube to said second endpoint of said first tube, a pair of first protrusions, each said first protrusion being coupled to and extending from said first nut toward said first terminus of said second tube, said first protrusions being complementary to said first slots and said second slots, wherein said first protrusions are positioned on said first nut such that each said first protrusion is positioned for inserting into a respective said first slot and a respective said second slot such that the user is positioned for grasping said second cylinder for rotating said second tube, a second rod positioned in and rotationally coupled to said second tube, said second rod having a first end and a second end, said first end of said second rod being configured for coupling to said second end of said first rod such that said first rod is positioned for transferring rotation of said shaft to said second rod, a plurality of second bearings, each said second bearing being coupled to said second tube and rotationally coupled to said second rod such that said second rod is positioned for rotating within said second tube, said plurality of second bearings comprising two said second bearings, a third channel extending into said second rod from said second end of said second rod, said third channel being squarely shaped when viewed from said second end of said second rod, said bit having a third section complementary to said third channel such that said third channel is positioned for inserting said third section of said bit for coupling said bit to said second rod, a cap threadedly couplable to said second terminus of said second tube, a first ball positioned in said cap, a fourth channel positioned through said first ball such that said bit is positionable through said first ball such that said first section and said second section said bit protrude through a first opening positioned in said cap, and a second nut threadedly coupled to said bit between said first ball and said second tube, said second nut being adjustably positionable on said bit for adjusting the protrusion of said second section of said bit from said cap;

a dampening module positioned around said shaft and coupled to said front of said housing, said dampening module being operationally coupled to said extender, wherein said dampening module is positioned on said housing such that said dampening module is positioned for shielding said housing from impact by said first cylinder as said first cylinder is motivated along said extender toward said housing, said dampening module comprising:

a disk, said disk being substantially circularly shaped, a first hole centrally positioned through said disk, said shaft being inserted through and selectively rotatable within said first hole, a first box coupled to said disk and extending toward said housing, said first box being open-faced distal from said disk, a second box coupled to said housing and extending toward said disk, said second box being open-faced distal from said housing, said second box being slidably positionable within said first box, a first spring positioned around said shaft, said first spring being coupled to and extending between said front of said housing and said disk such that said first spring is positioned for tensioning as said disk is motivated toward said front of said housing, a set of four second springs, each said second spring being coupled proximate to and extending between a respective corner of said first box and an associated corner of said second box such that said second springs are positioned for tensioning as said first box is motivated toward said second box, a ring coupled to and extending from said disk, said ring being opposing to said first spring, said ring being internally threaded such that said ring is positioned for threadedly inserting said first endpoint of said first tube for coupling said first tube to said dampening module, and a bellows positioned around said first box and said second box, said bellows being coupled to and extending between said front of said housing and said disk such that said bellows is positioned for compressing air positioned in said bellows as said disk is motivated toward said front of said housing;

a handle selectively couplable to said disk such that said handle is configured for grasping in a hand of the user for stabilizing said rotary tool relative to a work piece said handle comprising:

a bar, said bar being circularly shaped when viewed longitudinally, a bolt coupled to and extending from said bar, said bolt being threaded, a pair of second holes opposingly positioned in a perimeter of said disk, said second holes being complementary to said bolt, wherein said second holes are positioned in said disk such that each said second hole is positioned for selectively threadedly inserting said bolt for coupling said bar to said disk;

a third tube having a first terminus and a second terminus, said first terminus and said second terminus being open, said first terminus being positioned for inserting said shaft, said third tube being circularly shaped when viewed longitudinally, said third tube being externally threaded adjacent to said first terminus such that said third tube is positioned for coupling to said ring for coupling said third tube selectively and interchangeably to one of said dampening module and said extender;

a third nut coupled to an outer circumference of said third tube adjacent to said second terminus, wherein said third nut is positioned on said third tube such that said third nut is positioned for coupling to the wrench for threadedly coupling said first terminus of said third tube to said ring for coupling said third tube to said dampening module;

a pair of second protrusions, each said second protrusion being coupled to and extending from said third nut toward said first terminus of said third tube, said second protrusions being complementary to said first slots and said second slots;

a pair of fourth nuts, each said fourth nut being coupled to and positioned in said third tube;

a third rod positioned in said third tube, said third rod being threaded, said third rod being threadedly coupled to said fourth nuts;

a second coupler coupled to a first end of said third rod, said second coupler being configured for coupling to said shaft for coupling said third rod to said shaft such that said shaft is positioned for rotating said third rod;

a third coupler coupled to a second end of said third rod such that said third coupler protrudes from said second terminus of said third tube, said third coupler being complementary to a fourth coupler coupled to a suction cup, said third coupler being complementary to a fifth coupler coupled to a glue tab, each said fourth coupler and each said fifth coupler comprising a second ball and a stick, said third coupler comprising:

a shell, said shell being hollow, said shell being spherically shaped, a second opening positioned in said shell, said second opening being circularly shaped, and a third slot extending from said second opening wherein said second opening is positioned in said shell such that said second opening is positioned for inserting a respective said second ball positioning an associated said stick in said third slot;

a rim coupled to said ring distal from said disk;

a cone, said cone being frustum shaped defining an apex, said apex being open such that said apex is positioned for inserting said third tube, said apex being complementary to said rim such that said apex is positioned for inserting said rim for frictionally coupling said cone to said dampening module positioning said third tube within said cone;

a plurality of plates, each said plate being selectively couplable to a base of said cone, said base being open;

a third opening positioned in said cone, said third opening extending from said apex to said base;

a plurality of fifth channels, each said fifth channel being positioned in a respective said plate such that said fifth channel is positioned for selectively inserting said base of said cone for coupling said cone to said respective said plate;

a plurality of orifices, each said orifice being centrally positioned in an associated said plate, each said orifice having a respective size and a respective shape such that said plurality of orifices comprises a variety of sizes and shapes complementary to the sizes and the shapes of a set of said suction cups and a set of said glue tabs; and wherein said bit is positioned on said extender such that said rotary tool is positioned for rotating said bit for penetrating the sheet metal positioning said second section of said bit for coupling to the sheet metal, wherein said first cylinder is positioned on said extender such that said first cylinder is configured for grasping in the hand of the user for selectively propelling said first cylinder along said extender to said disk for applying the force to the dent in the sheet metal for repairing the dent.

* * * * *